United States Patent
Acharya et al.

(10) Patent No.: US 6,668,581 B1
(45) Date of Patent: Dec. 30, 2003

(54) CRYOGENIC SYSTEM FOR PROVIDING INDUSTRIAL GAS TO A USE POINT

(75) Inventors: Arun Acharya, East Amherst, NY (US); John Henri Royal, Grand Island, NY (US); Raymond Paul Roberge, Chappaqua, NY (US); Bayram Arman, Grand Island, NY (US); Brian Michael Meredith, Amherst, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 10/283,309

(22) Filed: Oct. 30, 2002

(51) Int. Cl.[7] .................................................. G25J 1/00
(52) U.S. Cl. ........................................................ 62/615
(58) Field of Search ............................ 62/615, 643, 646

(56) References Cited

U.S. PATENT DOCUMENTS

| | | | |
|---|---|---|---|
| 4,778,497 A | 10/1988 | Hanson et al. ................. 62/11 |
| 4,867,773 A * | 9/1989 | Thorogood et al. ........... 62/652 |
| 5,100,447 A * | 3/1992 | Krishnamurthy et al. ..... 62/630 |
| 5,697,228 A * | 12/1997 | Paige ........................... 62/615 |
| 5,799,505 A | 9/1998 | Bonaquist et al. ............. 62/613 |
| 5,836,173 A | 11/1998 | Lynch et al. ................... 62/613 |
| 5,893,275 A | 4/1999 | Henry ........................... 62/615 |
| 5,979,440 A * | 11/1999 | Honkonen et al. ....... 128/201.21 |
| 6,041,620 A | 3/2000 | Olszewski et al. ............. 62/612 |
| 6,041,621 A | 3/2000 | Olszewski et al. ............. 62/613 |
| 6,105,388 A | 8/2000 | Acharya et al. ................ 62/612 |
| 6,205,812 B1 | 3/2001 | Acharya et al. ................ 62/607 |
| 6,220,053 B1 | 4/2001 | Hass, Jr. et al. ............... 62/613 |
| 6,301,927 B1 * | 10/2001 | Reddy ........................... 62/619 |
| 6,357,257 B1 | 3/2002 | Goble, Jr. et al. ............. 62/613 |
| 6,389,814 B2 * | 5/2002 | Viteri et al. ................... 60/716 |
| 6,477,847 B1 * | 11/2002 | Bonaquist et al. ............. 62/99 |
| 6,502,421 B2 * | 1/2003 | Kotliar ........................... 62/640 |

* cited by examiner

*Primary Examiner*—William C. Doerrler
(74) *Attorney, Agent, or Firm*—Stanley Ktorides

(57) ABSTRACT

A system for providing industrial gas to a use point in relatively small quantities that would otherwise require the use of high pressure gas cylinders, wherein industrial gas is generated from a feed, liquefied using refrigeration generated by a refrigeration system, and stored in a storage vessel prior to provision to the use point. The preferred refrigeration system is a pulse tube system powered by gas associated with the industrial gas generation system.

22 Claims, 1 Drawing Sheet

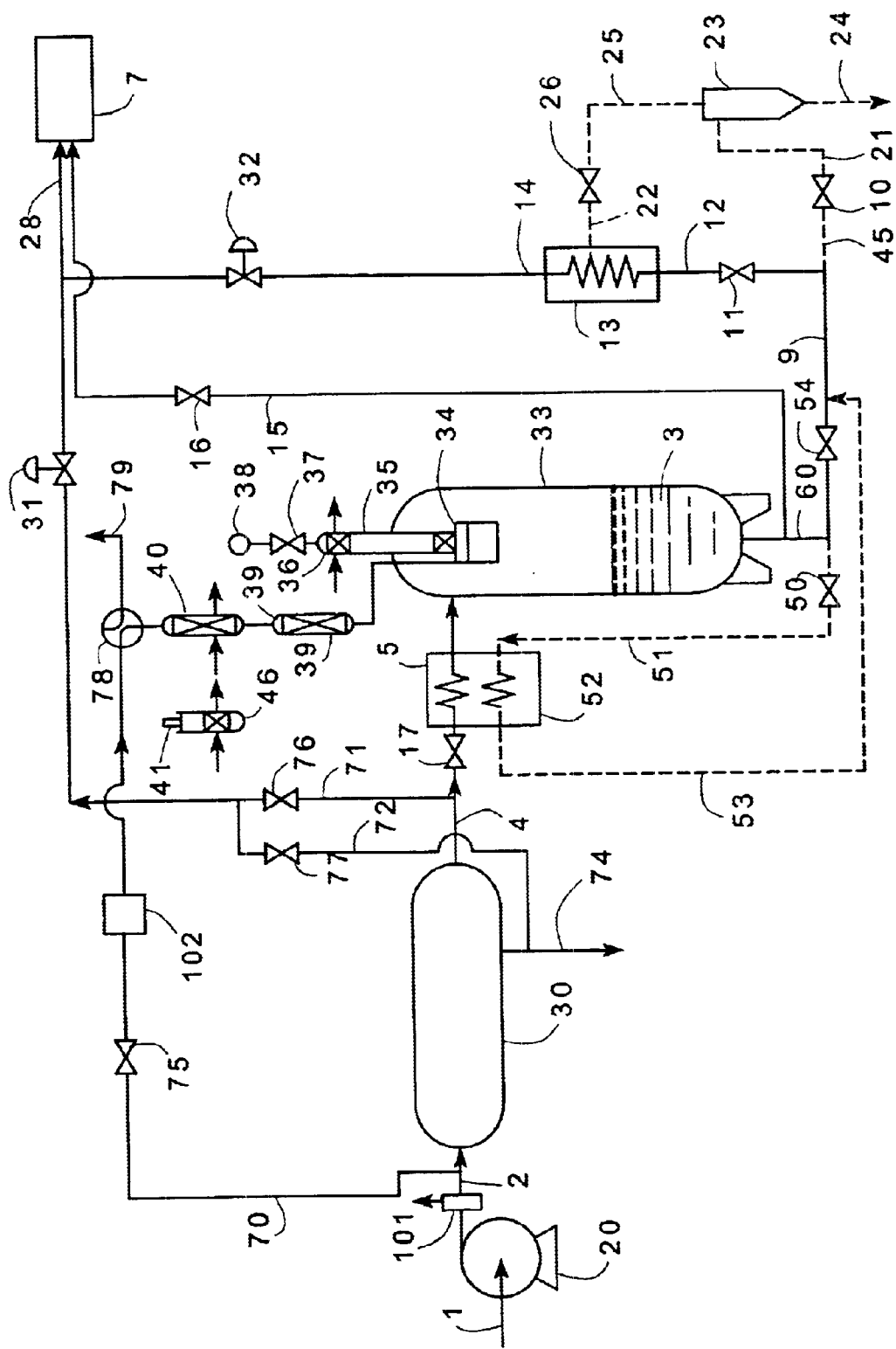

CRYOGENIC SYSTEM FOR PROVIDING INDUSTRIAL GAS TO A USE POINT

TECHNICAL FIELD

This invention relates generally to the provision of industrial gas to a use point which requires a relatively small quantity and/or intermittent provision of the industrial gas.

BACKGROUND ART

The economical provision of industrial gas to a use point which uses a relatively small amount of such gas has a number of factors with which to contend. The cost of the gas is a relatively small portion of the total cost of the product after it is delivered to the use point. The gas product is provided from high pressure cylinders which come in various sizes or capacities. The high pressure cylinders are relatively heavy and contain only a small volume of gas. Transportation of these cylinders is not inexpensive, and requires a fair amount of labor to move them from the central production plant to the point of use. The cylinders must be positioned and hooked up to a distribution manifold, requiring additional labor. Floor space is required for cylinders—both full and empty ones. The empty cylinders must be returned to the central production plant to be refilled. A more efficient and economical method is desirable to supply the use point with product without involving this labor-intensive system using heavy, low pay-load cylinders.

Accordingly it is an object of this invention to provide an improved system for providing industrial gas to a use point.

It is another object of this invention to provide an improved system for providing industrial gas to a use point which uses a relatively small amount of such gas.

SUMMARY OF THE INVENTION

The above and other objects, which will become apparent to those skilled in the art upon a reading of this disclosure, are attained by the present invention, one aspect of which is:

A method for providing industrial gas product to a use point comprising:
  (A) passing a gaseous industrial gas containing feed stream to an industrial gas generator, and producing gaseous industrial gas product in the industrial gas generator;
  (B) generating a cold working gas, warming the cold working gas by indirect heat exchange with gaseous industrial gas product to liquefy gaseous industrial gas product, and storing the liquefied industrial gas product in a storage vessel; and
  (C) providing industrial gas product from the storage vessel to the use point.

Another aspect of the invention is:

Apparatus for providing industrial gas product to a use point comprising:
  (A) an industrial gas generator, a storage vessel, means for passing industrial gas containing feed to the industrial gas generator, and means for passing industrial gas product from the industrial gas generator to the storage vessel;
  (B) a refrigeration system having a cold heat exchanger, said cold heat exchanger positioned to provide refrigeration to the industrial gas product; and
  (C) an industrial gas use point and means for providing industrial gas product from the storage vessel to the industrial gas use point.

As used herein the term "regenerator" means a thermal device in the form of porous distributed mass, such as spheres, stacked screens, perforated metal sheets and the like, with good thermal capacity to cool incoming warm gas and warm returning cold gas via direct heat transfer with the porous distributed mass.

As used herein the term "pulse tube refrigerator" means a refrigerator device to produce low temperature refrigeration using suitable components including a pulse generator.

As used herein the term "orifice" means a gas flow restricting device placed between the warm end of the pulse tube expander and a reservoir in a pulse tube refrigerator.

As used herein the term "pressure wave" means a mass of gas that goes through sequentially high and low pressure levels in a cyclic manner.

As used herein the term "industrial gas generator" means apparatus which receives a gaseous industrial gas containing feed stream and produces a gaseous industrial gas product which has a higher concentration of the industrial gas than that of the feed stream.

As used herein the term "working gas" means a gas used in a pulse tube refrigerator to produce refrigeration by going through cyclic pressure fluctuations. The working gas could be used in a closed cycle pulse tube system wherein the working gas could be helium, or in an open cycle pulse tube system wherein the working gas could be feed, e.g. air, product or waste gas from the industrial gas generator.

BRIEF DESCRIPTION OF THE DRAWING

The sole FIGURE is a schematic representation of one particularly preferred embodiment of the cryogenic industrial gas provision system of the invention wherein the cold working gas is generated using a pulse tube refrigeration system.

DETAILED DESCRIPTION

The invention will be described in detail with reference to the Drawing.

Referring now to the FIGURE, gaseous industrial gas containing feed stream 1 is passed to compressor 20 wherein it is compressed to a pressure generally within the range of from 30 to 1000 pounds per square inch absolute (psia) to produce pressurized industrial gas containing feed stream 2. Among the industrial gases which can be produced and provided to the use point as industrial gas product by the practice of this invention one can name nitrogen, oxygen, hydrogen, argon, helium and mixtures of one or more of the above. A particularly preferred industrial gas containing feed stream in the practice of this invention is air.

Referring back now to the FIGURE, pressurized industrial gas containing feed stream 2 is cooled in aftercooler 101 and passed to industrial gas generator 30 wherein it is processed to produce gaseous industrial gas product which is withdrawn from industrial gas generator 30 in stream 4 along with waste stream 74. One example of industrial gas generator 30 is a polymeric membrane separation unit which receives an air feed stream and produces a nitrogen industrial gas product having a nitrogen concentration generally of at least 90 mole percent. Another example of industrial gas generator 30 is a vacuum pressure swing adsorption unit which receives an air feed stream and produces an oxygen industrial gas product having an oxygen concentration generally within the range of from 40 to 99.9 mole percent. Yet another example of industrial gas generator 30 is a ceramic oxygen transport membrane unit which receives an air feed stream and produces an industrial gas product having an oxygen concentration generally within the range of from 40 to 99.9999 mole percent.

If desired, a portion 6 of gaseous industrial gas product 4 may be passed through valve 31 and then in line 28 to use point 7. One example of a use point is a medical facility where the industrial gas product employed is oxygen. Other typical use points include various manufacturing operations.

Gaseous industrial gas product from the industrial gas generator is liquefied and stored in storage vessel 33. In the embodiment of the invention illustrated in the FIGURE, gaseous industrial gas product 4 after passage through valve 17 is cooled by passage through heat exchanger 52 by indirect heat exchange with a cooling fluid, and the resulting cooled gaseous industrial gas product 5 is passed into storage vessel 33 wherein it is liquefied by refrigeration provided by cold heat exchanger 34 which is positioned within storage vessel 33. Alternatively the gaseous industrial gas product may be liquefied outside of storage vessel 33 using refrigeration from a cold heat exchanger which may be positioned outside of storage vessel 33, and the resulting liquefied industrial gas product may be passed into storage vessel 33 as liquid.

Any refrigeration system or cryocooler may be used in the practice of this invention to generate cold working gas for liquefying the gaseous industrial gas product. The preferred refrigeration system is a pulse tube refrigeration system. Other refrigeration cycles that can be employed in the cryocooler include magnetic refrigeration employing magnetocaloric materials operating under magnetic fields, and Joule-Thomson refrigeration. Other useful cryocooler cycles include variations of a Stirling cycle such as a Gifford-McMahon cycle, and an MGR (mixed gas refrigeration) cycle based on the Rankine cycle. The MGR cycle involves a refrigerant made up of different gas mixtures that is compressed by a common compressor, cooled by a set of precooling heat exchangers, and expanded via a Joule-Thomson isenthalpic expansion. Furthermore the cryocooler could be precooled using cold refrigerant or by another refrigerator. For instance, the pulse tube refrigerator could be precooled using liquid nitrogen refrigeration or by other refrigeration such as SGR (single gas refrigeration) or an MGR Rankine type refrigerator.

One embodiment wherein refrigeration for liquefying the gaseous industrial gas product is developed using a pulse tube refrigeration system is illustrated in the FIGURE and will now be described in greater detail. The pulse tube refrigeration system could be a closed cycle or open cycle refrigeration system that pulses a working gas or refrigerant and in so doing transfers a heat load from a cold section to a hot section. The frequency and phasing of the pulses is determined by the configuration of the system. One embodiment of a pulse tube refrigerator or refrigeration system is illustrated in the FIGURE.

In the open cycle pulse tube refrigeration system illustrated in the FIGURE, pulses are generated using rotary valve 78 and industrial gas feed, product or waste streams. In a closed cycle system a piston 41, an acoustic or thermoacoustic wave generation device, or any other suitable device may be used for providing a pulse or compression wave to a working gas. That is, the pulse generator provides a compression phase and an expansion phase to the working gas. Driver or pulse generator 41 provides a pulse to a working gas to produce a compressed working gas. Although not shown, the driver or pulse generator 41 could be actuated by industrial gas feed, product or waste streams using a valve similar to valve 78. Helium is the preferred working gas in a closed cycle system; however any effective working gas may be used in the practice of this invention and among such one can name air, nitrogen, oxygen, argon and neon.

In a particularly preferred embodiment the pressure wave generator of the pulse tube system may be integrated with the industrial gas generation system wherein some of the compressed industrial gas feed and/or some of the gaseous industrial gas product and/or some of the waste stream is used to generate the pulses, and may also be used as the working gas in an open cycle system. In such cases a rotary valve or some other mechanical means is used to generate the pulses required for the operation of the pulse tube refrigeration system. These particularly preferred embodiments are shown in the FIGURE. If it is desired to power the pulse tube with feed, e.g. air, under pressure, the air in the air-compressor discharge line 2 may be used. Line 70 then delivers pressurized air to valve 75, which may be opened to supply this commodity to the pulse tube system. The air is then passed through prepurifier 102 which will remove moisture and carbon dioxide before being transferred to rotary valve 78 ensuring that the pulse tube system will be able to operate with a clean gas. Rotary valve 78, operating at the desired frequency, supplies the pressurized pulses or air to the pulse tube system entering at heat exchanger 40. As rotary valve 78 rotates 90 degrees to the next position, the valve opens the chamber above the heat exchanger 40 to vent 79, dropping the pressure above heat exchanger 40 to a lower pressure. This generates the required pressure waves in the pulse tube system. Vent line 79 may alternatively be connected (not shown) to suction 1 of air compressor 20, if desired. The waste stream 74 from generator 30 is vented. Another option for powering the pulse tube system would be to connect line 71 to product line 4 from industrial gas generator 30. By opening valve 76 in line 71, the pulse tube would then be powered by the product gas from the industrial gas generator 30 rather than from air compressor 1. The pressure in line 71 is at a pressure just slightly below that of the air compressor. Pressure waves would then be generated by passing product gas through rotary valve 78 as previously discussed. The exhaust from rotary valve 78 could be vented to the atmosphere (line 79) or connected (not shown) to the suction line 1 of air compressor 20. In this case, the pulsating fluid in the pulse tube system would typically be nitrogen. Alternatively, a portion of the high pressure waste stream 74 may be used as the means of powering the pulse tube system. The product stream 4 is delivered to precooler 52 prior to condensation in tank 33. Stream 72 under pressure passes through open valve 77 to rotary valve 78 and on into heat exchanger 40 as indicated above. A further option can be considered to power the pulse tube if it is desired to use helium gas as the pulsating fluid in a closed cycle. In this case, the piston 41 is driven by a linear motor, valved reciprocating compressor, or acoustic drive, or a high pressure process stream via a rotary valve similar to valve 78, to generate the pulse waves in the pulse tube system. The pressure pulses generated by the driver would cause the piston 41 to send pulsating waves through heat exchanger 40 and the remainder of the pulse tube system.

The compressed working gas is cooled in aftercooler 40 or 46 wherein the heat of compression is removed by indirect heat exchange with cooling medium, such as water or air, and the resulting compressed working gas is then processed in regenerator 39. Within regenerator 39 the compressed working gas is cooled by heat exchange with regenerator media and then cooled compressed working gas is provided to cold heat exchanger 34 and then to the cold end of insulated pulse tube 35. If desired, instead of being cooled in heat exchanger 52, the gaseous industrial gas product from the industrial gas generator may be cooled in the cold end of insulated pulse tube 35 by indirect heat exchange prior to being liquefied.

The working gas within the pulse tube is adiabatically compressed in the direction of the warm end of the pulse tube and heat is removed from the warm end typically by use of a hot heat exchanger 36 by indirect heat exchange with cooling medium such as water or air. Preferably the pulse tube refrigeration system employs an orifice 37 and reservoir 38 to maintain the gas displacement and pressure pulses in appropriate phases.

The warmer compressed pulse tube gas within the warm end of pulse tube 35 is processed in hot heat exchanger 36 and then into reservoir 38 through orifice 37. The gas motion, in appropriate phase with the pressure, is facilitated by incorporating orifice or valve 37 and a reservoir volume 38 where the gas is stored at an average pressure with small fluctuation. The size of reservoir 38 is sufficiently large so that essentially very little pressure oscillation occurs in it during the oscillating flow in the pulse tube. The inlet flow from the wave-generation device/piston 41 stops and the tube pressure decreases by virtue of the return stroke of the compressor to a lower pressure. The cooled working gas at the cold end of the pulse tube, thus expanded, generates further cooled working gas. Gas from reservoir 38 at an average pressure passes through the orifice to the pulse tube, which is at the lower pressure. The further cooled expanded gas at the cold end of pulse tube 35 provides the refrigeration to liquefy the gaseous industrial gas product as it passes through the cold heat exchanger 34. Refrigeration from the further cooled working gas is thus passed by indirect heat exchange to the interior of vessel 33 thereby serving to liquefy the gaseous industrial gas product which forms a pool 3 within storage vessel 33. The resulting warmer working gas is further warmed by processing in regenerator 39 as it cools the regenerator. Then it is ready to receive the next pulse.

When it is desired to provide industrial gas product from storage vessel 33 to the use point, valve 54 is opened and liquefied industrial gas product is withdrawn from storage vessel 33 in stream 60. If desired, as illustrated in the FIGURE, some liquefied industrial gas product may be passed through valve 50 and as stream 51 to heat exchanger 52 as the cooling fluid to provide initial cooling to the gaseous industrial gas product provided to heat exchanger 52. The resulting warmed industrial gas product 53 is then combined with stream 60 to form stream 9 for passage to the use point. If desired a portion of the compressed feed 2, e.g. compressed air, may be passed, after appropriate aftercooling and purification steps, into the upper portion of tank or storage vessel 33 to pressurize the tank by adding heat into the tank and thus to facilitate the removal of liquefied industrial gas product from storage vessel 33. High pressure waste or product streams could also be used to pressurize the system.

The industrial gas product may be provided from the storage vessel to the use point in liquid or in gaseous form. The embodiment of the invention illustrated in the FIGURE is a preferred embodiment wherein the liquefied industrial gas product is vaporized prior to passage to the use point. In this embodiment liquid industrial gas product in stream 9 is passed through valve 11 and then as stream 12 into vaporizer 13 wherein it is vaporized, emerging therefrom as vaporized industrial gas product 14. Alternatively, as shown by the dotted lines, some or all of steam 9 may pass as stream 45 through valve 10 and flashed to form two phase stream 21 which is passed to flashpot or phase separator 23. Liquid is withdrawn from phase separator 23 in stream 24, and vapor is passed out of phase separator 23 in line 25. The flashpot arrangement is particularly useful when the liquid industrial gas product contains heavier or less volatile contaminants, such as might be the case when nitrogen is the industrial gas product, since the flashing of the liquid industrial gas will serve to increase the concentration of the more volatile industrial gas, i.e. nitrogen, in the vapor which is passed out of flashpot 23 in stream 25. Stream 25 is passed through valve 26 and resulting stream 22 is combined with stream 12 in heat exchanger 13 to form gaseous industrial gas product stream 14. The flow of stream 14 is controlled by valve 32 which passes the gaseous industrial gas product in line 28 to use point 7. Also, as shown by stream 15, industrial gas product may be passed as liquid to use point 7 by opening valve 16, in addition to or in place of the vaporized industrial gas product.

Now by the use of this invention, one can effectively provide relatively small amounts of industrial gas product to a use point without the need to employ high pressure cylinders as in the conventional practice discussed above. Although the invention has been described in detail with reference to a certain particularly preferred embodiment, those skilled in the art will recognize that there are other embodiments within the spirit and the scope of the claims.

What is claimed is:

1. A method for providing industrial gas product to a use point comprising:

(A) passing a gaseous industrial gas containing feed stream to an industrial gas generator, and producing gaseous industrial gas product in the industrial gas generator;

(B) generating a cold working gas, warming the cold working gas by indirect heat exchange with gaseous industrial gas product to liquefy gaseous industrial gas product, and storing the liquefied industrial gas product in a storage vessel; and (C) providing industrial gas product from the storage vessel to the use point, wherein the cold working gas is generated by providing a pulse to a working gas to produce compressed working gas, and expanding the compressed working gas in a cold section of a pulse tube, and wherein a portion of the industrial gas feed stream is used as the working gas.

2. The method of claim 1 wherein the industrial gas containing feed stream is air.

3. The method of claim 2 wherein the industrial gas product has a nitrogen concentration of at least 90 mole percent.

4. The method of claim 2 wherein the industrial gas product has an oxygen concentration within the range of from 40 to 99.9 mole percent.

5. The method of claim 1 wherein the industrial gas product is provided to the use point in gaseous form.

6. The method of claim 1 wherein the industrial gas product is provided to the use point in liquid form.

7. The method of claim 1 wherein a portion of the gaseous industrial gas feed stream is used to provide pulses for generating the cold working gas.

8. The method of claim 1 wherein a portion of the gaseous industrial gas product is used to provide pulses for generating the cold working gas.

9. The method of claim 1 wherein the production of industrial gas product produces waste gas and wherein waste gas is used to provide pulses for generating the cold working gas.

10. The method of claim 1 wherein the industrial gas product is cooled prior to being liquefied by indirect heat exchange with liquefied industrial gas product.

11. Apparatus for providing industrial gas product to a use point comprising:
 (A) an industrial gas generator, a storage vessel, means for passing industrial gas containing feed to the industrial gas generator, and means for passing industrial gas product from the industrial gas generator to the storage vessel;
 (B) a refrigeration system having a cold heat exchanger, said cold heat exchanger positioned to provide refrigeration to the industrial gas product; and
 (C) an industrial gas use point and means for providing industrial gas product from the storage vessel to the industrial gas use point, wherein the refrigeration system is a pulse tube refrigeration system having a pulse generator, and further comprising means for passing industrial gas containing feed to the pulse tube refrigeration system.

12. The apparatus of claim 11 wherein the industrial gas generator is a polymeric membrane separation unit.

13. The apparatus of claim 11 wherein the industrial gas generator is a vacuum pressure swing adsorption unit.

14. The apparatus of claim 11 wherein the industrial gas generator is a ceramic oxygen transport membrane unit.

15. The apparatus of claim 11 wherein the cold heat exchanger is within the storage vessel.

16. The method of claim 1 further comprising passing gaseous industrial gas containing feed into the storage vessel.

17. The method of claim 1 further comprising passing gaseous industrial gas product into the storage vessel.

18. The method of claim 1 further comprising passing a portion of the industrial gas product directly from the industrial gas generator to the use point.

19. The method of claim 1 wherein the industrial gas product is passed from the storage vessel to the use point in both gaseous and liquid form.

20. A method for providing industrial gas product to a use point comprising:
 (A) passing a gaseous industrial gas containing feed stream to an industrial gas generator, and producing gaseous industrial gas product in the industrial gas generator;
 (B) generating a cold working gas, warming the cold working gas by indirect heat exchange with gaseous industrial gas product to liquefy gaseous industrial gas product, and storing the liquefied industrial gas product in a storage vessel; and
 (C) providing industrial gas product from the storage vessel to the use point, wherein the cold working gas is generated by providing a pulse to a working gas to produce compressed working gas, and expanding the compressed working gas in a cold section of a pulse tube, and wherein a portion of the gaseous industrial gas feed stream is used to provide pulses for generating the cold working gas.

21. A method for providing industrial gas product to a use point comprising:
 (A) passing a gaseous industrial gas containing feed stream to an industrial gas generator, and producing gaseous industrial gas product in the industrial gas generator;
 (B) generating a cold working gas, warming the cold working gas by indirect heat exchange with gaseous industrial gas product to liquefy gaseous industrial gas product, and storing the liquefied industrial gas product in a storage vessel; and
 (C) providing industrial gas product from the storage vessel to the use point, wherein the cold working gas is generated by providing a pulse to a working gas to produce compressed working gas, and expanding the compressed working gas in a cold section of a pulse tube, and wherein a portion of the industrial gas product is used as the working gas.

22. A method for providing industrial gas product to a use point comprising:
 (A) passing a gaseous industrial gas containing feed stream to an industrial gas generator, and producing gaseous industrial gas product in the industrial gas generator;
 (B) generating a cold working gas, warming the cold working gas by indirect heat exchange with gaseous industrial gas product to liquefy gaseous industrial gas product, and storing the liquefied industrial gas product in a storage vessel; and
 (C) providing industrial gas product from the storage vessel to the use point, wherein the cold working gas is generated by providing a pulse to a working gas to produce compressed working gas, and expanding the compressed working gas in a cold section of a pulse tube, and wherein the production of industrial gas product produces waste gas which is used as the working gas.

* * * * *